United States Patent [19]

Hartmann

[11] 4,349,234
[45] Sep. 14, 1982

[54] WEAR RESISTANT WHEEL FOR ENDLESS TRACK

[75] Inventor: Ewald Hartmann, Cologne, Fed. Rep. of Germany

[73] Assignee: Clouth Gummiwerke Aktiengesellschaft, Cologne, Fed. Rep. of Germany

[21] Appl. No.: 105,499

[22] Filed: Dec. 20, 1979

Related U.S. Application Data

[63] Continuation of Ser. No. 914,188, Jun. 12, 1978, abandoned, which is a continuation of Ser. No. 724,973, Sep. 20, 1976, abandoned.

[30] Foreign Application Priority Data

Sep. 19, 1975 [DE] Fed. Rep. of Germany ....... 2541776

[51] Int. Cl.³ .............................................. B62D 55/12
[52] U.S. Cl. ..................................................... 305/56
[58] Field of Search ............. 305/56, 21; 301/36 WP, 301/39 C, 39 CC, 65, 63 R

[56] References Cited

U.S. PATENT DOCUMENTS 3,007,745 11/1961 Even ...................................... 305/56
3,910,638 10/1975 Scott ................................ 301/63 R

FOREIGN PATENT DOCUMENTS 1939239 2/1971 Fed. Rep. of Germany ........ 305/56
1939240 11/1971 Fed. Rep. of Germany ........ 305/56
2164288 6/1973 Fed. Rep. of Germany ........ 305/21

Primary Examiner—David A. Scherbel
Attorney, Agent, or Firm—Becker & Becker, Inc.

[57] ABSTRACT

An endless track vehicle wheel which simultaneously serves for guiding the track guiding teeth of a cooperating track. The guiding flanks of the wheel which face the track guiding teeth of the track are protected by wear-protecting rings shrunk onto the wheel.

3 Claims, 3 Drawing Figures

WEAR RESISTANT WHEEL FOR ENDLESS TRACK

This is a continuation of application Ser. No. 914,188, filed June 12, 1978, now abandoned, which is a continuation of Ser. No. 724,973, filed Sept. 20, 1976, now abandonded.

The present invention relates to an endless track vehicle having a wheel which at the same time serves for guiding the chain guiding teeth and in which the guiding flanks facing the chain guiding teeth and protected against wear by rings of steel.

The guiding flanks of endless track vehicle wheels which face the chain guiding teeth are subjected to a considerable wear by the continuous friction between the chain guiding teeth and the guiding flanks of the wheel. The heretofore known endless track vehicle wheels are, therefore, provided with protective means against wear at the guiding flanks.

With endless track vehicle wheels of steel, the guiding flanks are, for instance, surface-hardened. After the hardened layer has worn off, the endless track vehicle wheel can be made usable again by build-up welding. The service life of the surface-hardened layer and of the build-up weld is not very long in view of the thinness of the respective layer. Furthermore, the application of the build-up weld requires considerable time.

Endless track vehicle wheels frequently also consist of light metal. This is highly desirable in view of the saving in weight, especially with armored track laying vehicles. Inasmuch as aluminum cannot be connected to steel by welding, it has heretofore been the practice to connect steel rings to the endangered flanks by riveting such steel rings to the flanks. This spot fastening does, however, not withstand for any length of time the stresses due to lateral shocks and the tensions due to different temperature coefficients of light metal, on the one hand, and steel, on the other hand, and furthermore cannot withstand the widening or enlargement which results from the hammering action of the chain guiding teeth.

The spraying of steel onto the guiding flanks of the light metal rims also has not been able to prevent that the wheels have to be exchanged prematurely for the sole reason of wear or because of a premature breaking up or flaking off of the protective layer, even though the rubber bands or tires did not yet wear off.

It is, therefore, an object of the present invention to provide an endless track vehicle wheel in which the guiding flanks facing the chain guiding teeth will be protected in such a way that, on the one hand, a safe hold of the wear-protective ring will be assured while, on the other hand, the worn off protective rings can be exchanged with relatively little work involved.

These and other objects and advantages of the invention will appear more clearly from the following specification in connection with the accompanying drawing, in which.

Figure 1:
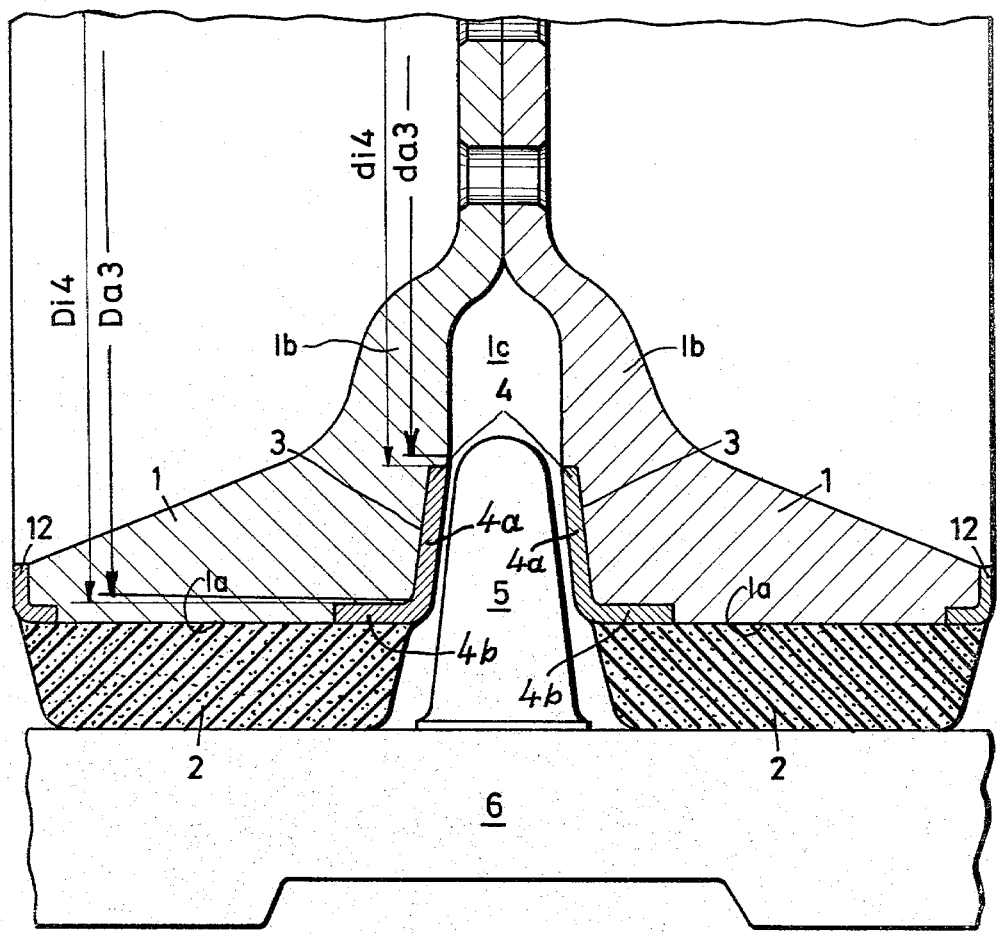
FIG. 1 represents a section through the wheel rim zone of an endless track vehicle wheel according to the invention.

The endless track vehicle wheel according to the present invention is characterized primarily in that the wear-protective rings are shrunk onto the endless track vehicle wheels. The shrinking-on of the wear-protective rings onto the endless track vehicle wheels causes no difficulties at all, and neither does the exchange of a worn off wear-protective ring for a new ring. The removal of a worn wear-protective ring can be effected, for instance, by cutting open the ring.

Over heretofore known endless track vehicle wheels of steel, the endless track vehicle wheel according to the present invention has the advantage that the service life of the wear-protective rings is considerably higher than the service life of the relatively thin surface hardened layer, and that the exchange of the wear-protective rings is considerably more simple and can be carried out faster than is the case with the application of a build-up weld.

Compared with previously known endless track vehicle wheels of light metal the endless track vehicle wheel according to the present invention has the further advantage that the wear-protective rings will not detach themselves during a heating up of the rings or when the rings are subjected to hard hammering stresses. A still further advantage of the present invention over previous endless track vehicle wheels of light metal consists in that a good heat transfer will be assured between the wear-protective rings and the endless track vehicle wheels. Moreover, the connecting area between the wear-protective rings and the endless track vehicle wheel is subjected only to pressure and not to pull stresses.

Inasmuch as the vehicles equipped with such endless track vehicle wheels even at low temperatures must not lose their proper working capabilities, the degree of shrinkage is expediently so selected that at a temperature of $-40°$ C. there will still remain an adequate shrinkage tension.

An advantageous embodiment of the endless track wheel vehicle according to the invention consists in that the wear-protective rings are angle-shaped in such a way that one leg extends substantially horizontally while the other leg is located approximately parallel to the adjacent surface of the chain or track guiding teeth. Due to the horizontal arrangement of one leg of the ring assurance exists that no thrust component will be generated by the shrinking-on of the wear-protective ring while the arrangement of the other leg provides for the chain or track guiding teeth a relatively large butting surface.

According to a further development of the invention, the horizontally directed leg of the wear-protective ring extends over the entire width of the respective wheel rim of the endless track vehicle wheel whereby the adherence of the wear-protective ring to the wheel becomes still more favorable.

According to another feature of the invention, the horizontally extending leg of the wear-protective ring projects beyond that side of the endless track vehicle wheel which faces away from the chain or track guiding teeth and thereby forms a wear-protective edge.

To assure a proper fit of the wear-protective ring on the endless track vehicle wheel, advantageously the undersize of the inner diameter of the wear-protective ring at that leg which extends approximately parallel to the adjacent surface of the chain or track guiding teeth relative to the outer diameter of the respective region of the recess in the endless track vehicle wheel is less than the undersize of the inner diameter at the horizontally extending leg of the wear-protective ring relative to the outer diameter of the respective region of the recess in the endless track vehicle wheel.

According to a still further development of the invention, a temperature resistant adhesive, for instance an epoxy resin adhesive, is provided between the wheel rim of the endless track vehicle wheel and the wear-resistant ring. When using this feature of the invention, only a slight shrinking tension or stress is required between the wear-protective ring and the endless track vehicle wheel. The thickness of the adhesive layer should expediently not exceed 0.3 mm.

A particularly advantageous embodiment of the invention consists in that on that side of the endless track vehicle wheel which faces away from the chain or track guiding teeth there are likewise provided wear-protective rings which may, however, have smaller dimensions than the first mentioned wear-protective rings.

Referring now to the drawing in detail, according to the embodiment illustrated in FIG. 1, the running surfaces of the wheel rims 1 are provided with rubber bands or tires 2. In corresponding recesses 3 of the wheel rims there are arranged angle-shaped wear protective rings 4 which are shrunk onto the wheel rims 1. One of the legs of each wear protective ring 4, namely leg 4b, extends substantially horizontally, whereas the other leg 4a extends approximately parallel to the adjacent surface of the chain guiding teeth 5 of chain 6. The undersize of the inner diameter di4 of leg 4a relative to the outer diameter da3 of the respective region of the recess 3 opposite leg 4a is less than the undersize of the inner diameter Di4 of leg 4b relative to the outer diameter Da3 of the respective region of the recess 3 opposite leg 4b. This has been shown on an exaggerated scale in FIG. 1.

The rims 1 have a cylindrical tire supporting surfaces 1a and depending inwardly extending flanges 1b which form a radially opening slot 1c into which the teeth 5 of the toothed track are received. The flanges 1b each have opposed spaced apart portions between which the slot 1c is formed and abutting portings.

Wear-protective rings 12 are provided at that side of the endless chain wheel which faces away from the chain guiding teeth 5.

Figure 2:
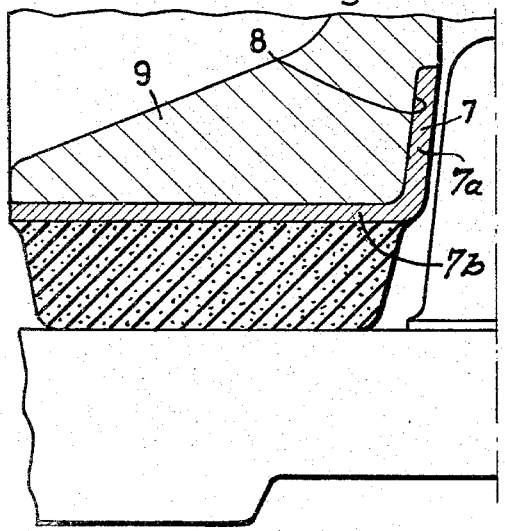
FIG. 2 shows a section through the left-hand side of the wheel rim zone of a modified endless track vehicle wheel according to the invention.

The embodiment according to FIG. 2 differs from that of FIG. 1 in that the wear-protective ring 12 has been omitted and that in this instance the horizontally extending leg 7b of ring 7 extends over the entire width of the respective wheel rim 9 of the endless track vehicle wheel while the other leg 7a or ring 7 is arranged in a recess 8 of the wheel rim 9 of the endless track vehicle wheel.

Figure 3:
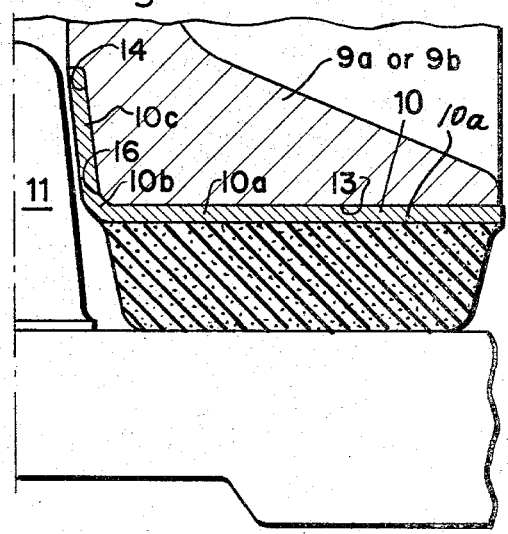
FIG. 3 shows a section through the right-hand side of still another endless track vehicle wheel according to the invention.

The embodiment of FIG. 3 differs from that of FIG. 2 in that the horizontally extending leg 10a of the wear-protective ring 10 projects slightly beyond that side of the endless track vehicle wheel which faces away from the chain guiding teeth 11.

In essence, the wear resistant ring 10 of FIG. 3 is a unitary annular member having a cylindrical portion 10a connected at a juncture 10b to an annular flange portion 10c. The cylindrical portion 10a of each ring 10 is heat shrunk over the cylindrical surface 13 of the rim 9a or 9b upon which the ring 10 is shrunk. The annular flange portion 10c of each ring 10 nests within the respective recess 14 in the spaced apart portion (see FIG. 1) of the rim flanges 9a or 9b. The annular flange portion 10c of each ring 10 is heat shrunk into engagement with the respective recess 14 while the juncture 10 is heat shrunk over the shoulder 16 of the rim 9a or 9b.

It is, of course, to be understood that the present invention is, by no means, limited to the specific showing is the drawing but also comprises any modifications within the scope of the appended claims.

What I claim is:

1. A wheel specifically for use with an endless track vehicle which wheel operates with a toothed track having a plurality of teeth, said wheel comprising:

first and second spaced rims each having a cylindrical tire supporting surface and a depending inwardly extending flange, wherein the flanges have opposed spaced apart portions which form a radially opening slot into which the teeth of the toothed track are received, each of the flanges having a radially positioned recess extending partially into said spaced apart portions and opening into the slot, the recesses joining the cylindrical tire supporting surface to form a circular shoulder.

a unitary, wear resistant ring heat shrunk onto each of said rims; each ring including a cylindrical portion connected at a juncture to an annular flange portion, the cylindrical portion of each ring being heat shrunk over the cylindrical surface of the rim upon which the ring is mounted and extending slightly past the edge of the cylindrical surface before termination; the annular flange portion of each ring nesting within the respective recess in the spaced apart portion of the rim flange and being heat shrunk into engagement therewith, and the junctures between the cylindrical portions and flange portions of the rings being heat shrunk over the shoulders of the rims, said flange portion extending substantially parallel to the extent of said teeth of the toothed track.

2. The wheel of claim 1 further including a layer of temperature-resistant adhesive disposed between said wear-protective rings on the adjacent rim and recess area.

3. The wheel of claim 2 wherein the adhesive is an epoxy resin.

* * * * *